United States Patent
Miyake et al.

(10) Patent No.: US 7,171,019 B2
(45) Date of Patent: Jan. 30, 2007

(54) IMAGE PROCESSING APPARATUS AND IMAGE PROCESSING METHOD

(75) Inventors: Nobutaka Miyake, Kanagawa (JP); Kiyoshi Umeda, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 10/252,702

(22) Filed: Sep. 24, 2002

(65) Prior Publication Data

US 2003/0059085 A1 Mar. 27, 2003

(30) Foreign Application Priority Data

Sep. 26, 2001 (JP) ............................. 2001-293856
Aug. 21, 2002 (JP) ............................. 2002-240118

(51) Int. Cl.
G06K 9/00 (2006.01)
G06K 15/00 (2006.01)
H04L 9/00 (2006.01)

(52) U.S. Cl. ..................... 382/100; 358/3.28; 71/176
(58) Field of Classification Search ............... 382/100; 358/3.28; 713/176
See application file for complete search history.

(56) References Cited

U.S. PATENT DOCUMENTS

| | | | | |
|---|---|---|---|---|
| 5,315,098 A | * | 5/1994 | Tow | ........................... 235/494 |
| 5,617,119 A | * | 4/1997 | Briggs et al. | ................ 707/100 |
| 5,864,742 A | * | 1/1999 | Gasper et al. | ............... 399/366 |
| 5,949,055 A | * | 9/1999 | Fleet et al. | .................. 235/469 |
| 6,763,121 B1 | * | 7/2004 | Shaked et al. | .............. 382/100 |
| 6,885,755 B1 | * | 4/2005 | Yamaguchi | .................. 382/100 |
| 2001/0028727 A1 | * | 10/2001 | Naito et al. | .................. 382/100 |
| 2001/0030761 A1 | * | 10/2001 | Ideyama | ...................... 358/1.9 |
| 2002/0054356 A1 | * | 5/2002 | Kurita et al. | ............... 358/3.28 |
| 2002/0054680 A1 | * | 5/2002 | Huang et al. | .................. 380/54 |
| 2002/0090110 A1 | * | 7/2002 | Braudaway et al. | ........ 382/100 |
| 2002/0105679 A1 | * | 8/2002 | Haynes | ...................... 358/3.28 |
| 2002/0114490 A1 | * | 8/2002 | Taniguchi et al. | ........... 382/100 |
| 2003/0021439 A1 | * | 1/2003 | Lubin et al. | ................. 382/100 |
| 2003/0026450 A1 | * | 2/2003 | Powell et al. | ................ 382/100 |

* cited by examiner

*Primary Examiner*—Bhavesh M. Mehta
*Assistant Examiner*—Anthony Mackowey
(74) *Attorney, Agent, or Firm*—Fitzpatrick, Cella, Harper & Scinto

(57) ABSTRACT

An image processing apparatus for embedding predetermined information in an image includes an input unit for inputting the image, a division unit for dividing the input image into plural image regions, a periodicity generation unit for generating plural different periodicities, an addition unit for adding a predetermined value to a pixel value of each pixel in the image region divided by the division unit, on the basis of the periodicity, and a selection unit for selecting the periodicity for the addition from among the plural periodicities, in accordance with the predetermined information. Thus, image quality deterioration is reduced and an extraction error ratio at a time of extracting additional information is also reduced in a method of embedding the additional information in the image.

12 Claims, 11 Drawing Sheets

FIG. 6A

| | | | | $-\alpha$ | $-\alpha$ | $+\alpha$ | $+\alpha$ |
|---|---|---|---|---|---|---|---|
| | | $-\alpha$ | $-\alpha$ | $+\alpha$ | $+\alpha$ | | |
| $-\alpha$ | $-\alpha$ | $+\alpha$ | $+\alpha$ | | | | |
| $+\alpha$ | $+\alpha$ | | | | | $-\alpha$ | $-\alpha$ |
| | | | | $-\alpha$ | $-\alpha$ | $+\alpha$ | $+\alpha$ |
| | | $-\alpha$ | $-\alpha$ | $+\alpha$ | $+\alpha$ | | |
| $-\alpha$ | $-\alpha$ | $+\alpha$ | $+\alpha$ | | | | |
| $+\alpha$ | $+\alpha$ | | | | | $-\alpha$ | $-\alpha$ |

FIG. 6B

| | | $-\alpha$ | $+\alpha$ | | | $-\alpha$ | $+\alpha$ |
|---|---|---|---|---|---|---|---|
| | | $-\alpha$ | $+\alpha$ | | | $-\alpha$ | $+\alpha$ |
| | | $-\alpha$ | $+\alpha$ | | | $-\alpha$ | $+\alpha$ |
| | | $-\alpha$ | $+\alpha$ | | | $-\alpha$ | $+\alpha$ |
| $-\alpha$ | $+\alpha$ | | | $-\alpha$ | $+\alpha$ | | |
| $-\alpha$ | $+\alpha$ | | | $-\alpha$ | $+\alpha$ | | |
| $+\alpha$ | | | $-\alpha$ | $+\alpha$ | | | $-\alpha$ |
| $+\alpha$ | | | $-\alpha$ | $+\alpha$ | | | $-\alpha$ |

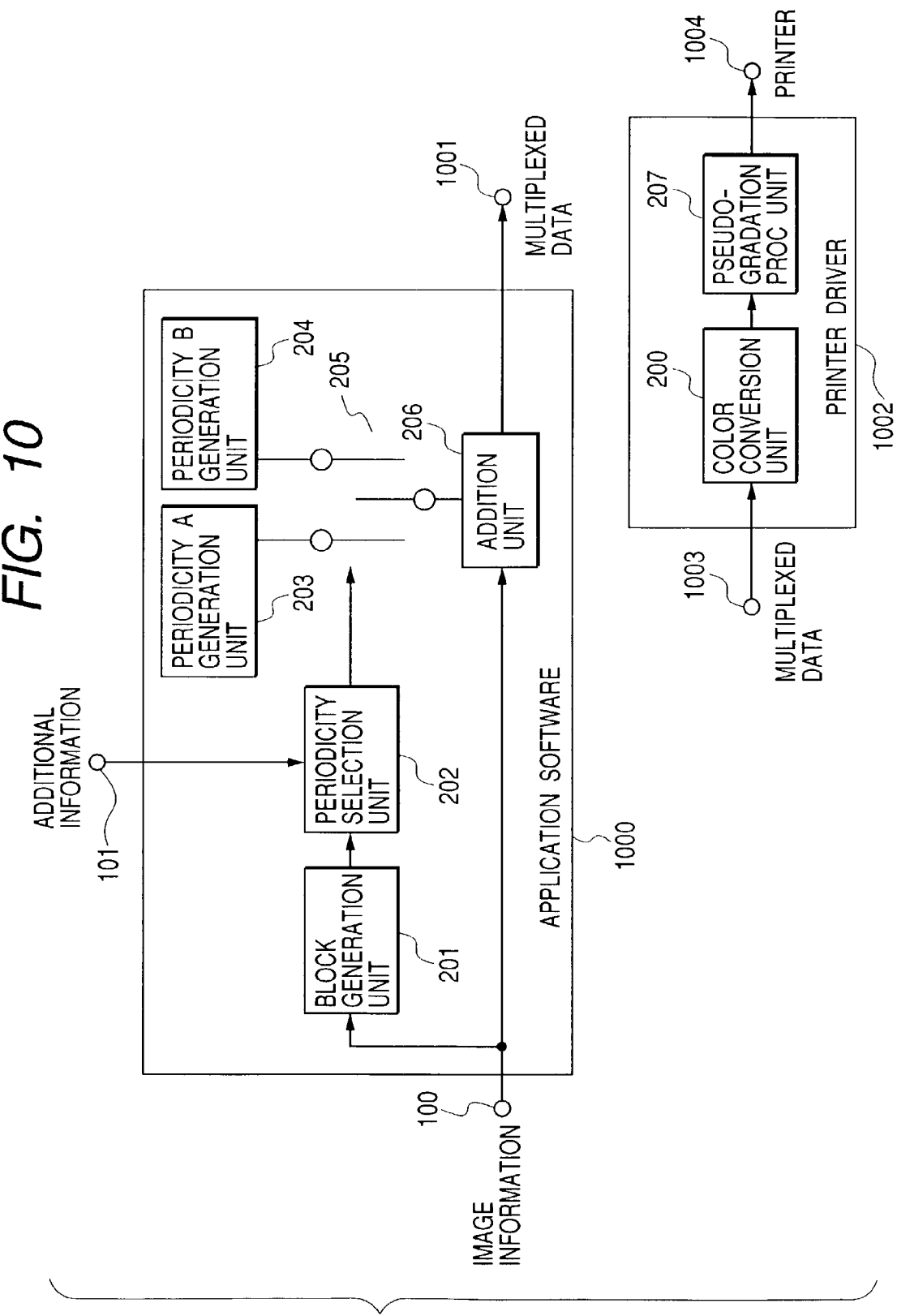

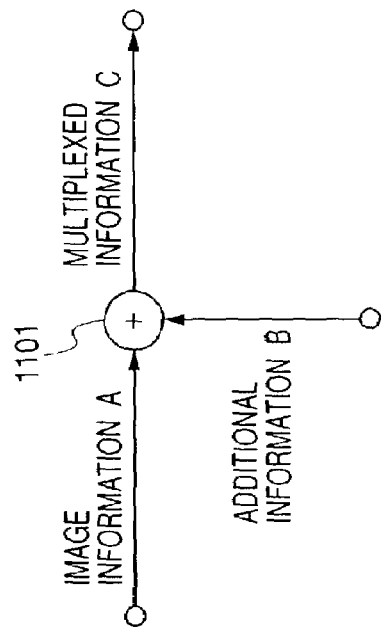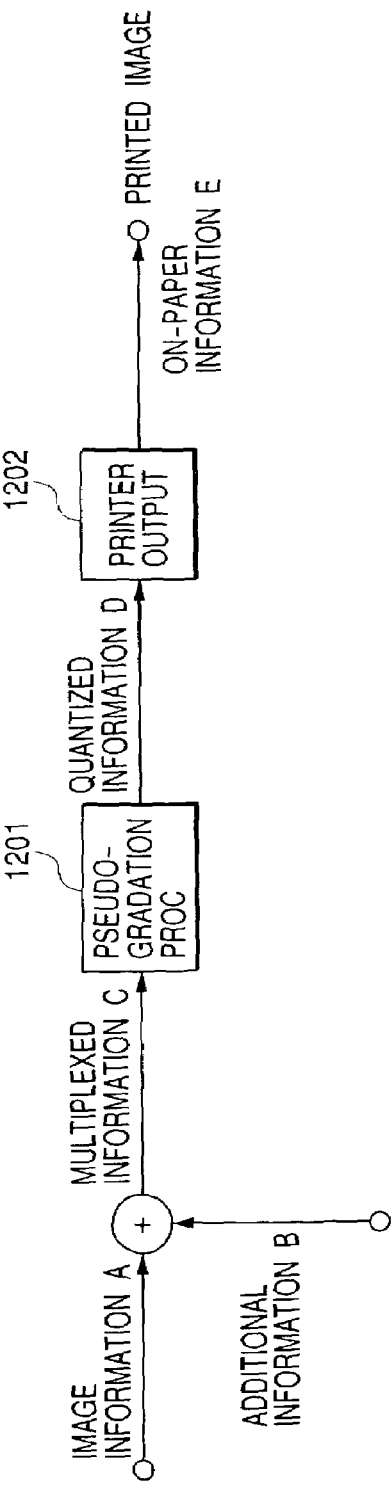

IMAGE PROCESSING APPARATUS AND IMAGE PROCESSING METHOD

BACKGROUND OF THE INVENTION

1. Field of the Invention

The present invention relates to an image processing apparatus and an image processing method.

2. Related Background Art

Conventionally, it has been actively studied to multiplex, in image information, other information concerning an image represented by the image information.

In recent years, a technique so-called an electronic watermark technique is standardized. The electronic watermark technique is the technique to multiplex, in the image information representing a photograph, a painting and the like, additional information representing its author's name, license and the like so that it becomes difficult to visually distinguish the additional information, and to circulate the multiplexed information through a network such as the Internet or the like.

As general methods of embedding the additional information, the electronic watermark technique provides two methods, that is, one of embedding the additional information in real space, and the other of embedding the additional information by using a frequency band.

The simplest method of embedding the electronic watermark in real space is the method of decomposing the image information into bit planes, and allocating the bit plane of LSB (least significant bit) as the bit plane of the additional information.

Besides, in the method of embedding the additional information by using the frequency band, orthogonal transformation such as Fourier transformation, discrete cosine transformation, wavelet transformation or the like is used. In any case, there is the method of embedding the additional information by changing a transformation coefficient of a specific band with use of a high frequency band which is difficult to be visually remarkable or low and middle frequency bands which are difficult to be influenced by quantization of the transformation coefficient in data compression. Moreover, there is the electronic watermark method that resistance to attack is hardened by using spectrum diffusion.

These conventional methods as above are explained in detail in Kineo MATSUI "Basic of Electronic Watermark", Morikita Publishing Company, August 1998.

However, there are following problems in these conventional methods.

That is, the conventional method of embedding the electronic watermark premises that it is used on an electronic file.

FIG. 11 is a diagram showing additional information embedding which is generally performed in the electronic watermark technique, that is, image information A and additional information B are multiplexed by an addition unit 1101 to generated multiplexed information C. Incidentally, FIG. 11 shows an example that the additional information is multiplexed in the real space region of the image information. If it is possible to circulate the multiplexed information C without various image processes such as filtering and the like and various encoding such as unreversible compression and the like, the additional information B can be easily decoded from the multiplexed information C even in the conventional technique. If the image information circulated on the Internet has a certain level of noise resistance, the additional information B can be decoded even if digital filtering to improve image quality such as for edge emphasis, smoothing and the like is performed.

However, it is assumed that the multiplexed image information is printed by an output apparatus such as a printer or the like and the additional information is captured from such a printed image, and moreover, it is assumed that print output is performed by using the printer merely having expressive power of about two to several gradations for each color. In recent years, although an ink-jet printer which can express several gradations for each color by using ink of low-density dye and variably controlling output dot diameters is available, the gradation of a photographic image can not be expressed as long as a pseudo-gradation process is not performed.

That is, on the premise that the multiplexing method using the electronic watermark technique shown in FIG. 11 is applied to the printer output, as shown in FIG. 12, the multiplexed information C is converted into quantized information D through a pseudo-gradation process 1201 and then printed on a paper through printer output 1202, whereby the multiplexed information C is changed to on-paper information (printed image) E having deteriorated image quality. Therefore, to decode the additional information from the on-paper information is to decode the additional information B from the on-paper information E after a series of processes in FIG. 12 is performed. Incidentally, information change amounts by the processes 1201 and 1202 are remarkably large, whereby it is very difficult to multiplex the additional information so that the multiplexed information can not be visually discriminated and to correctly decode the multiplexed additional information from the paper.

In the above method of embedding the additional information in the bit plane in real space, it is almost impossible to decode the embedded information on the paper.

On one hand, as for this, even a method of changing a power value in a specific frequency band is similar.

For example, Japanese Patent Application Laid-Open No. 7-123244 proposes a technique of multiplexing information by embedding additional information in a color difference component of which sensitivity is visually low and a high frequency band of a saturation component.

However, in this technique, each bit data is allocated to each specific band (or specific frequency band), and "1" or "0" is expressed according to whether or not a pattern should be added to the specific band. Besides, in decoding, a frequency component of the specific band is extracted, and "1" or "0" is discriminated according to a threshold process.

In this method, there are the following problems.

Since the threshold process is performed to the absolute value of the power, the decoding from the paper is easily influenced by noise.

In order to strengthen against the noise, it is necessary to perform the multiplexing strongly, whereby image quality deteriorates.

Since a pseudo-gradation process is performed at a later stage, there is a fear that the absolute value of the power deteriorates due to filtering of the pseudo-gradation process.

In order to cause the paper to have resistance to rotation, a start bit is necessary in the specific band.

The process is complicated as a whole.

That is, as above, the method of discriminating "1" bit or "0" bit according to the magnification of the absolute value of the power in the specific band has many problems.

SUMMARY OF THE INVENTION

Therefore, the present invention has been made to solve the above problems, and an object thereof is to provide an image processing apparatus and an image processing method capable of controlling image quality deterioration due to embedding of information and easily extracting the information from a paper.

In order to achieve the above object, the image processing apparatus according to the present invention is characterized by an image processing apparatus which embeds predetermined information in an image, comprising: an input means for inputting the image; a division means for dividing the input image into plural image regions; a periodicity generation means for generating plural different periodicities; an addition means for adding a predetermined value to a pixel value of each pixel in the image region divided by the division means, on the basis of the periodicity; and a selection means for selecting the periodicity for the addition from among the plural periodicities, in accordance with the predetermined information.

Moreover, the image processing apparatus according to the present invention is characterized by an image processing apparatus which embeds predetermined information in an image, comprising: an input means for inputting the image; a division means for dividing the input image into plural image regions; a periodicity generation means for generating plural different periodicities; an addition means for adding a predetermined value to a pixel value of each pixel in the image region divided by the division means, on the basis of the periodicity; a selection means for selecting the periodicity for the addition from among the plural periodicities, in accordance with the predetermined information; a conversion means for converting each pixel into a density signal for each coloring material; and a recording means for recording the density signal after the conversion by the conversion means, on a printing medium, wherein the addition means performs the addition process to the information before the conversion by the conversion means.

Moreover, the image processing method according to the present invention is characterized by an image processing method of embedding predetermined information in an image, comprising: an input step of inputting the image; a division step of dividing the input image into plural image regions; a periodicity generation step of generating plural different periodicities; an addition step of adding a predetermined value to a pixel value of each pixel in the image region divided in the division step, on the basis of the periodicity; and a selection step of selecting the periodicity for the addition from among the plural periodicities, in accordance with the predetermined information.

Moreover, the image processing method according to the present invention is characterized by an image processing method of embedding predetermined information in an image, comprising: an input step of inputting the image; a division step of dividing the input image into plural image regions; a periodicity generation step of generating plural different periodicities; an addition step of adding a predetermined value to a pixel value of each pixel in the image region divided in the division step, on the basis of the periodicity; a selection step of selecting the periodicity for the addition from among the plural periodicities, in accordance with the predetermined information; a conversion step of converting each pixel into a density signal for each coloring material; and a recording step of recording the density signal after the conversion in the conversion step, on a printing medium, wherein the addition process in the addition step is performed to the information before the conversion in the conversion step.

Other objects and the features of the present invention will be become apparent from the following specification and the attached drawings.

BRIEF DESCRIPTION OF THE DRAWINGS

FIGS. 6A and 6B are diagrams showing examples of two kinds of periodicities to be added;

FIG. 10 is a block diagram showing the substantial part of an additional information multiplexing apparatus according to the third embodiment;

FIG. 11 is a block diagram showing an example of multiplexing in a conventional method; and FIG. 12 is a block diagram showing the example of the multiplexing in the conventional method.

DETAILED DESCRIPTION OF THE PREFERRED EMBODIMENTS

Hereinafter, the preferred embodiments of the present invention will be explained in detail with reference to the attached drawings. Here, it should be noted that it is effective to have an image processing apparatus according to the embodiments mainly as printer driver software or application software in a computer of generating image information to be output to a printer engine, and it is also effective to have the image processing apparatus as hardware and software in a copying apparatus, a facsimile apparatus, a printer main body or the like.

First Embodiment

Figure 1:
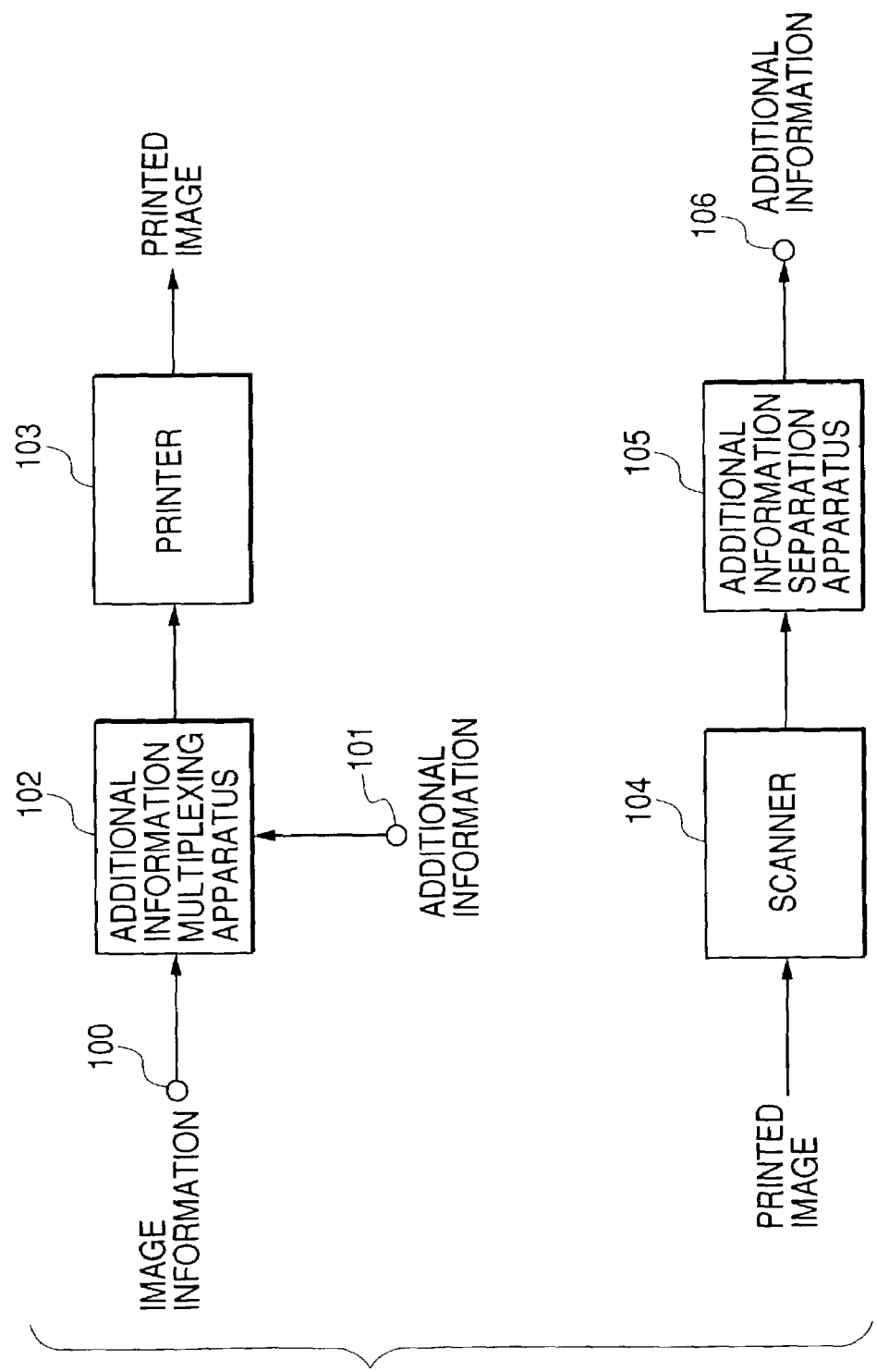
FIG. 1 is a block diagram showing the substantial part of an image processing system according to the present invention.

FIG. 1 is a block diagram showing the structure of an image processing system according to the first embodiment.

In FIG. 1, each of numerals 100 and 101 denotes an input terminal, that is, multiple-gradation image information is input through the input terminal 100, and necessary additional information to be embedded in the image information is input through the input terminal 101. The additional information is the information different from the image information input through the input terminal 100, and may be, for example, audio information, text document information, various information concerning license, shooting date and hour, shooting place, a cameraman and the like with respect to the image input through the input terminal 100, completely different image information, and the like.

Numeral 102 denotes an additional information multiplexing apparatus which embeds the additional information in the image information so that the embedded information is difficult to be visually discriminated. The additional information multiplexing apparatus 102 also controls quantization of the input multiple-gradation image information as well as the multiplexing of the additional information.

Numeral 103 denotes a printer which outputs the information generated by the additional information multiplexing apparatus 102, by using a printer engine. Here, as the printer 103, various printers such as an ink-jet printer, a laser beam printer and the like capable of expressing gradations by using a pseudo-gradation process are assumed.

The information on the printed image output by the printer 103 is read by a scanner 104, the additional information embedded in the printed image is separated by an additional information separation apparatus 105, and the separated information is output to an output terminal 101.

Figure 2:
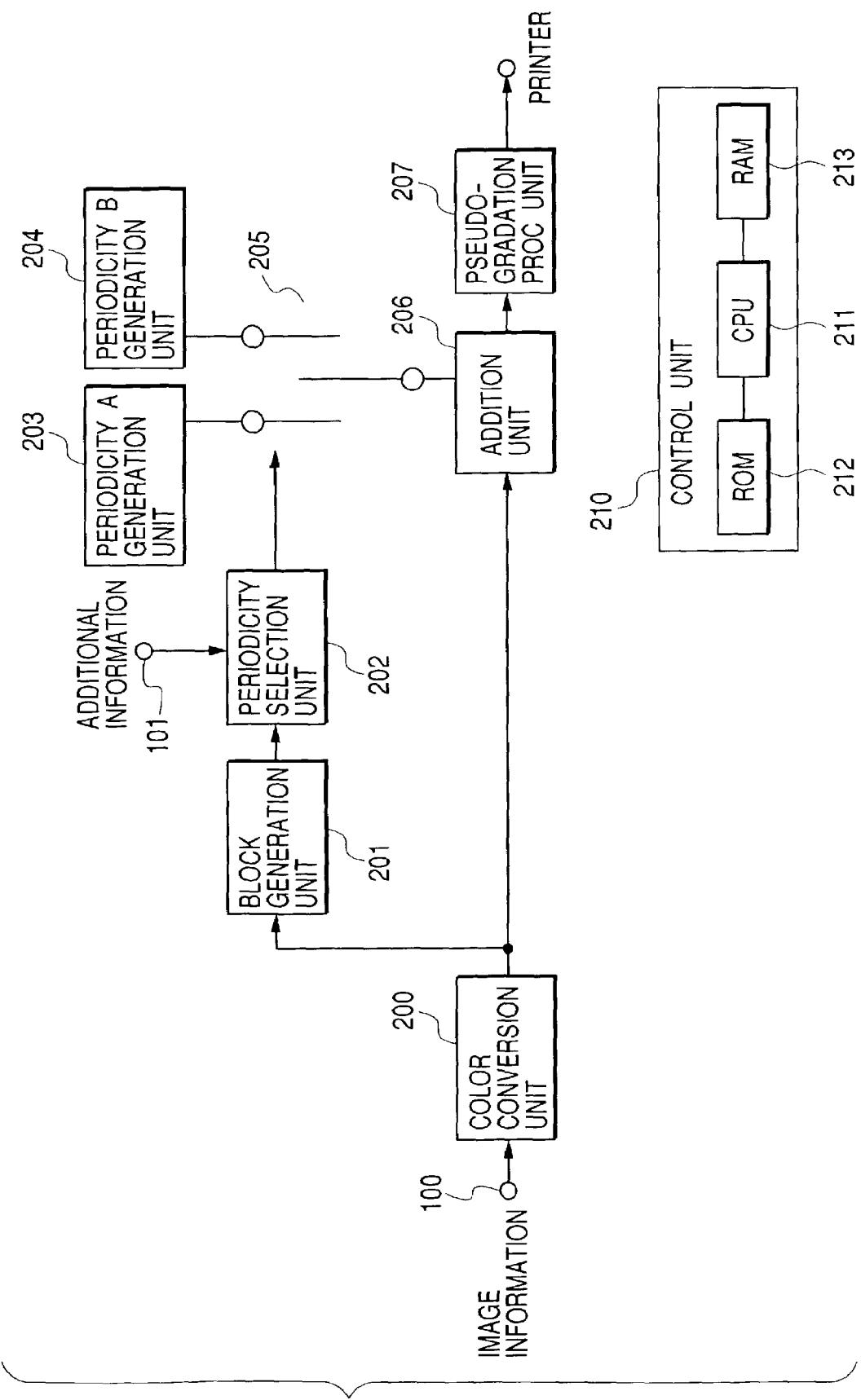
FIG. 2 is a block diagram showing the substantial part of an additional information multiplexing apparatus shown in FIG. 1.

FIG. 2 is a block diagram showing the structure of the additional information multiplexing apparatus 102 shown in FIG. 1.

In FIG. 2, numeral 200 denotes a color conversion unit which converts the input image information such as R, G and B brightness signals or the like into signals to be managed in color space based on coloring materials such as recording inks and the like.

Numeral 201 denotes a block generation unit which segments or divides the image signal decomposed to each ink color, for each predetermined region. Here, the block generation unit 201 may segment the image signal into rectangular block regions or block regions other than the rectangular block regions.

Numeral 202 denotes a periodicity selection unit which selects specific periodicity for each region segmented by the block generation unit 201, on the basis of the additional information input through the input terminal 101.

Numerals 203 and 204 respectively denote a periodicity A generation unit and a periodicity B generation unit, and each of the units 203 and 204 is selected by a switch 205 on the basis of the selection result of the periodicity selection unit 202. Then, the selected periodicity is added to the image signal by an addition unit 206.

Numeral 207 denotes a pseudo-gradation processing unit which performs a pseudo-gradation process to the image information after it is multiplexed for each color, converts the information to generate quantization levels of which the number is less than the number of input gradations, and then expresses area gradation based on quantized values of plural pixels. Although a dither process, an error diffusion process and the like are possible as the pseudo-gradation process, it is assumed that the error diffusion process is used in the present embodiment because this process can achieve excellent expressive power.

Numeral 210 denotes a control unit which is composed of a CPU 211, a ROM 212 and a RAM 213. Here, the CPU 211 controls the operations and the processes of such components as described above in accordance with control programs stored in the ROM 212, and the RAM 213 is used as the working area for the CPU 211.

Figure 3:
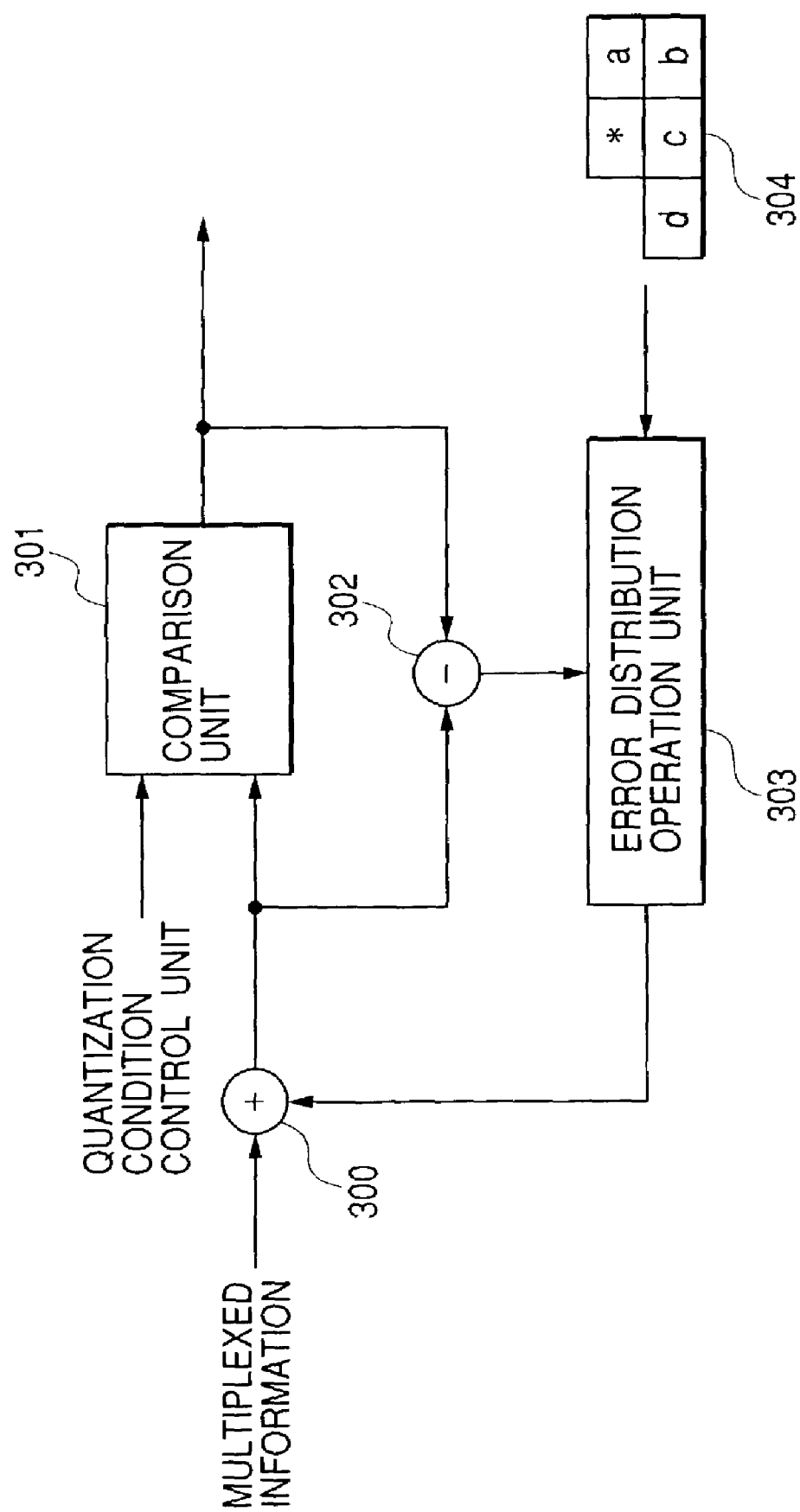
FIG. 3 is a block diagram showing the substantial part of an error diffusion means shown in FIG. 2.

FIG. 3 is a block diagram showing the detail of the error diffusion process to be performed by the pseudo-gradation processing unit 207. Here, it should be noted that the general error diffusion process is described in R. Floyd & L. Steinberg "An Adaptive Algorithm for Spatial Grayscale", SID Symposium Digest of Paper, pp. 36–37 (1975).

Here, the error diffusion process that the quantization value is binary will be explained by way of example, but the quantization itself is not limited to the binary data, that is, multivalued data, ternary data and four-value data may be managed in the quantization.

Numeral 300 denotes an addition unit which adds together an attention pixel value of multiplexed information to which additional information has been added and an already-binarized quantization error diffused to the peripheral pixel.

Then, a quantization threshold sent from a quantization condition control unit and the addition result to which the error has been added are compared with each other by a comparison unit 301, and "1" is output if the compared result is larger than a predetermined threshold, while "0" is output if other conditions are satisfied. For example, in case of expressing the gradation of the pixel with eight-bit accuracy, it is general to express it by "255" being the maximum value and "0" being the minimum value. Here, it is assumed that dots (by ink, toner and the like) are printed on a paper when the quantization value is "1".

Numeral 302 denotes a subtracter which calculates an difference (i.e., error) between the quantization result and the above addition result, and an error distribution operation unit 303 distributes the errors to the peripheral pixels to which future quantization process is to be performed. In this case, an error distribution table 304 experimentally set based on relative distances to the attention pixel is previously provided, and the errors are distributed on the basis of distribution rates described on the error distribution table 304.

The error distribution table 304 of FIG. 3 represents the error distribution table of peripheral four pixels, but the present invention is not limited to this.

Next, an entire operation procedure including the operation of the periodicity selection unit 202 will be explained with reference to a flow chart shown in FIG. 4.

In a step S400, a variable i is initialized. Here, the variable i is the variable for counting an address in the vertical direction.

In a step S401, a variable j is initialized. Here, the variable j is the variable for counting an address in the horizontal direction.

Next, in a step S402, it is judged whether or not the coordinates of the variables i and j representing the current processing address belong to the region to which the multiplexing process should be performed.

Figure 5:
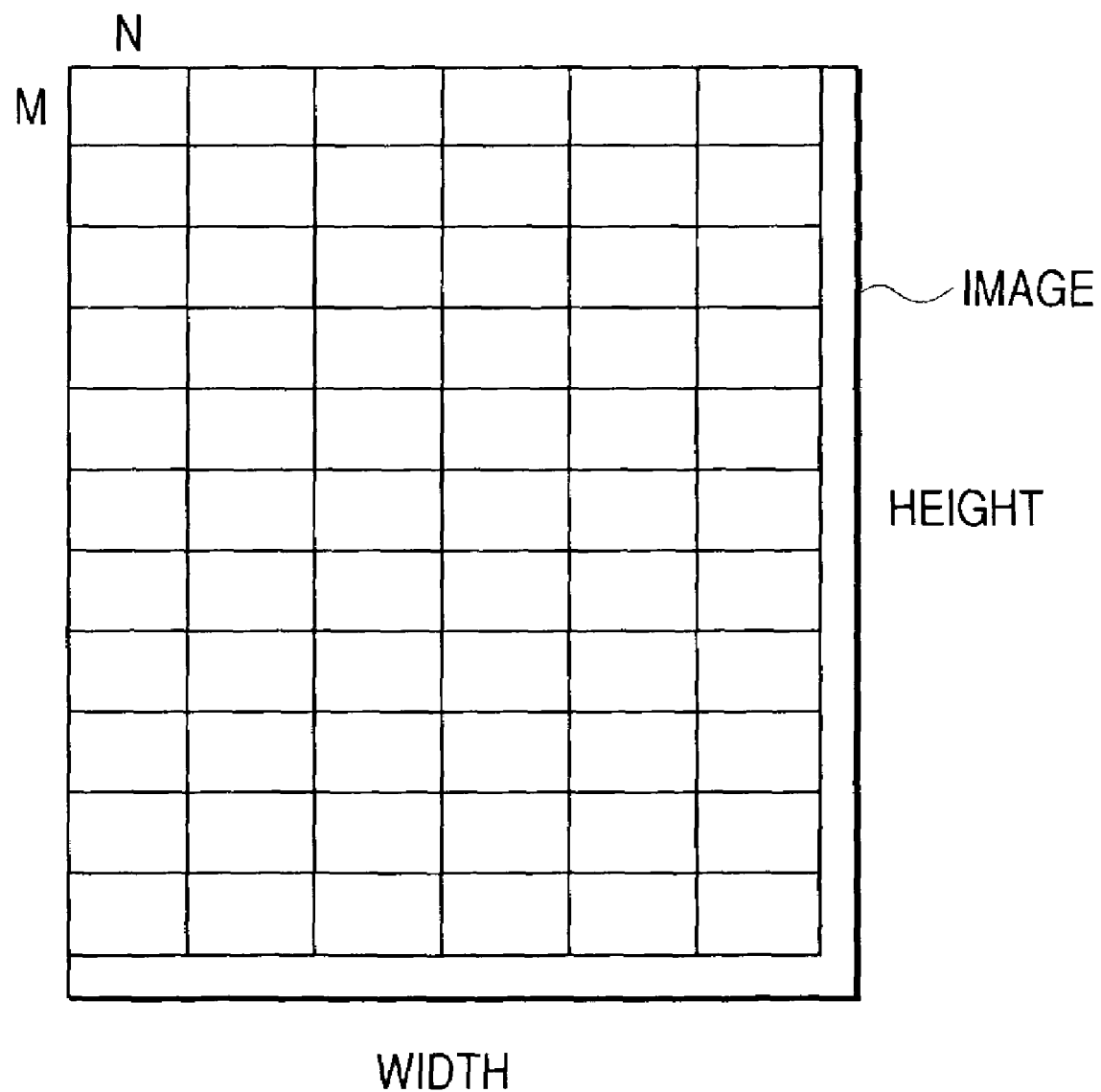
FIG. 5 is a diagram showing an example of a block.

Then, the multiplexing region will be explained with reference to FIG. 5. FIG. 5 shows one image of which the number of horizontal pixels is represented by WIDTH and the number of vertical pixels is represented by HEIGHT. Here, it is assumed that the additional information is multiplexed in this image. Blocks each of which is composed of lateral N pixels and longitudinal M pixels are generated and arranged from the upper left of the image set as the original point. In the present embodiment, although the original point is set as the basing point, the point distant from the original point may be set as the basing point. Incidentally, when the maximum information is to be multiplexed in this image, the blocks each of which is composed of N×M pixels are arranged from the basing point. That is, if it is assumed that the number of blocks capable of being arranged in the horizontal direction is W and the number of blocks capable of being arranged in the vertical direction is H, the following expressions (1) and (2) are satisfied.

$$W = INT(WIDTH/N) \quad (1)$$

$$H = INT(HEIGHT/M) \quad (2)$$

where INT( ) represents the integer portion of ( ).

The number of surplus pixels which can not be divided in each of the expressions (1) and (2) corresponds to the edge when the plural N×M blocks are arranged and is thus positioned outside the coding and multiplexing region.

Figure 4:
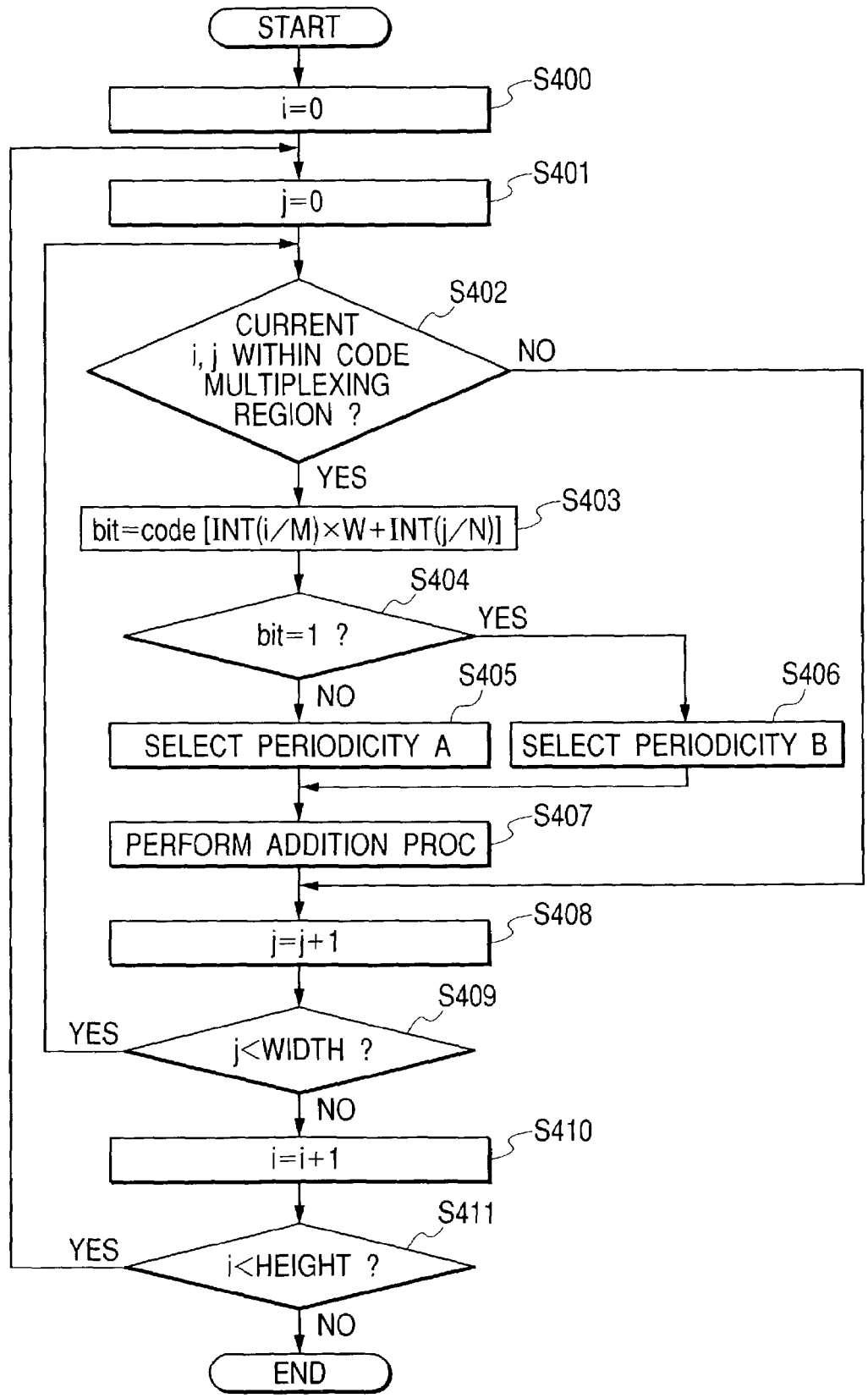
FIG. 4 is a flow chart showing an operation procedure of a multiplexing process including a periodicity selection means.

In FIG. 4, if it is judged in the step S402 that the attention pixel now being processed is within the multiplexing region, the additional information to be multiplexed is read. Here, to simplify the explanation, it is assumed that the additional information is expressed for each bit by using an arrangement code[ ]. For example, if it is assumed that the additional information is the information of 48 bits, the arrangement code[ ] is given from code[0] to code[47] each of which stores one bit.

In a step S403, the information in the arrangement code[ ] is substituted for a variable bit.

$$\text{bit}=\text{code}[INT(i/M)\times W+INT(j/N)] \quad (3)$$

Next, it is judged in a step S404 whether or not the obtained variable bit is "1". As described above, since each arrangement code[ ] stores the information of one bit, the value of the variable bit is represented by "0" or "1". Incidentally, if judged in the step S404 that the variable bit is "0", the flow advances to a step S405 to select periodicity A, while if judged that the variable bit is "1", the flow advances to a step S406 to select periodicity B.

Next, in a step S407, an addition process of the selected periodicity is performed.

FIGS. 6A and 6B are diagrams respectively showing examples of the periodicities A and B. In these drawings, it is assumed that one small square corresponds to one pixel, a numeral in each square represents an addition value, and the addition value of the blank square is 0. That is, addition of $+\alpha$ and $-\alpha$ is performed to the pixel value at a predetermined period of each of the periodicities A and B.

Only the direction of the periodicity shown in FIG. 6A is different from that shown in FIG. 6B, that is, the period in the horizontal direction and the period in the vertical direction are only mutually replaced.

Incidentally, it should be noted that each of FIGS. 6A and 6B shows the addition period by using a table of 8×8 pixels. That is, even if the size of the used table is not the same as that of a table of N×M pixels, it only has to use the existing table repeatedly.

Next, in a step S408, the variable j in the horizontal direction is incremented by one, and it is judged in a step S409 whether or not the incremented variable j is less than WIDTH being the number of horizontal pixels of the image. The above process is repeated until the number of processed pixels reaches WIDTH. Besides, if the process in the horizontal direction corresponding to the number (WIDTH) of horizontal pixels ends, the variable i in the vertical direction is incremented by one in a step S410, and it is judged in a step S411 whether or not the incremented variable i is less than HEIGHT being the number of vertical pixels of the image. Similarly, the above process is repeated until the number of processed pixels reaches HEIGHT.

By the above operation procedure, it is possible to add the periodicity according to the code of the additional information for each block composed of N×M pixels.

The pseudo-gradation process in the error diffusion method depends on the characteristic of the above error distribution table 304, but generally has a characteristic of a wide-band high-pass filter. For this reason, if the information is added in the same low and middle frequency bands that only the directions of the periodicities are changed as shown in FIGS. 6A and 6B, the power of the band where the information is added is slightly interrupted by the error diffusion filter, but the power can be attenuated almost uniformly. In other words, it is desirable to design the process as paying attention to the following points.

In the plural periodicities to be generated, only the directions thereof are different from others.

The table which has the almost uniform characteristic of no anisotropy, as the filter interruption characteristic by the distribution table in the error diffusion method, is used.

Moreover, with respect to how the power of the band where the information is added remains on the paper, the amplitude value a is experimentally determined in optimization of the image quality.

Next, the additional information separation apparatus 105 will be explained.

Figure 7:
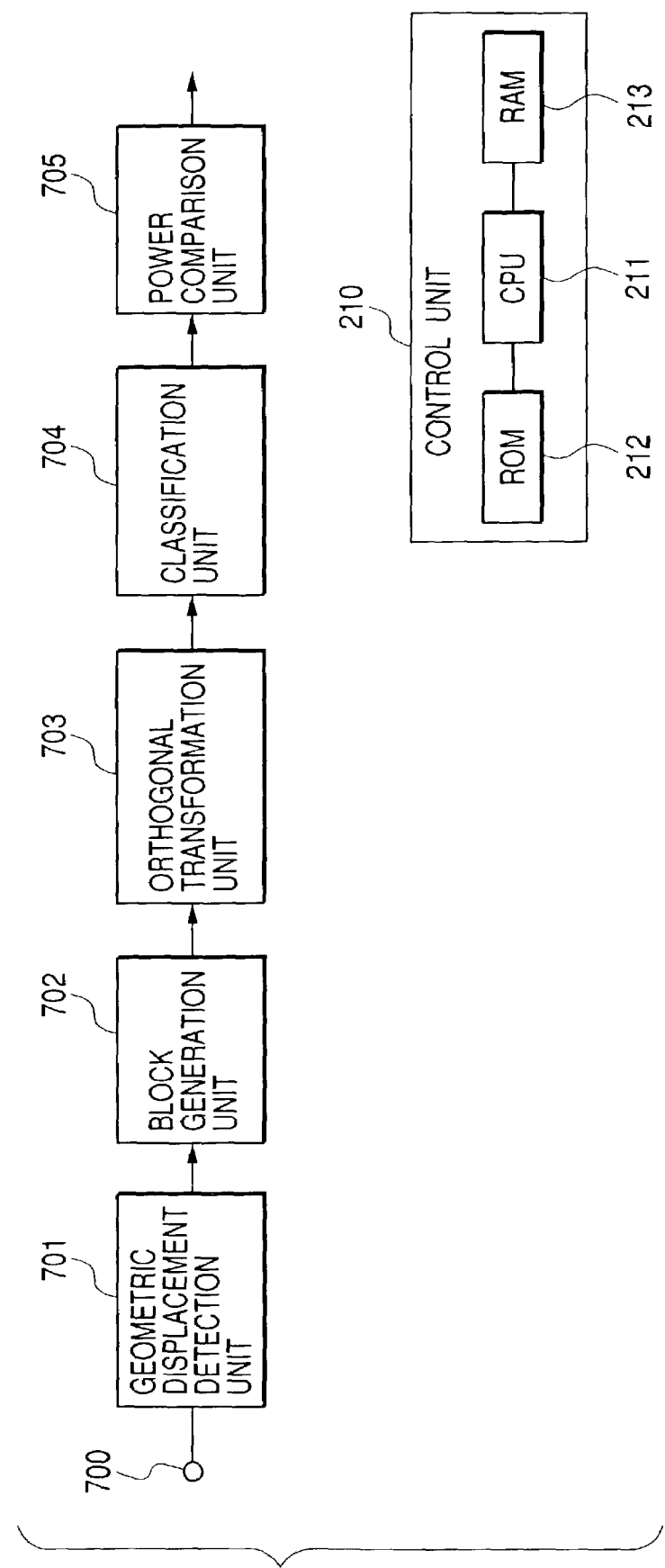
FIG. 7 is a block diagram showing the substantial part of an additional information separation apparatus shown in FIG. 1.

FIG. 7 is a block diagram showing the structure of the additional information separation apparatus 105.

In FIG. 7, numeral 700 denotes an input terminal through which the information read by the scanner is input. Here, it should be noted that the resolution of the used scanner is preferably equal to or higher than that of the printer of producing the printed image. In order to accurately read the dotted information of the printed image, it is of course necessary that the resolution on the scanner side is twice or more the resolution on the printer side in accordance with a sampling theorem. However, if the resolution on the scanner side is equal to or higher than the resolution on the printer side, the dotted information can be distinguished to some extent though it is not accurate. In the present embodiment, to simplify the explanation, it is assumed that the printer resolution is the same as the scanner resolution.

Numeral 701 denotes a geometric displacement detection unit which detects geometric displacement (or aberration) of the image input through the scanner. Here, there is of course a case where the image information sent from the scanner through the input terminal 700 is geometrically and greatly displaced from the image information before the printer output because it passes the various processes, whereby the geometric displacement detection unit 701 detects the four edge points of the region where the image information of the printed image is assumed to be printed. Here, if the printer resolution is the same as the scanner resolution, the rotation direction (oblique direction) of the image due to oblique paper feed on the printer, displacement (or aberration) at a time of setting the document on the scanner, and the like is the great factor to be corrected. Thus, it is possible by detecting the four edge points to discriminate how the displacement occurs in the rotation direction.

Numeral 702 denotes a block generation unit which generates the blocks each composed of P×Q pixels. Here, this block should be smaller than the block composed of N×M pixels generated in the multiplexing. That is, the following relation should be satisfied.

$$P \leq N \text{ and } Q \leq M \quad (4)$$

Moreover, when the blocks each composed of P×Q pixels are generated, they are skipped at certain constant intervals. That is, these blocks are generated so that one block composed of P×Q pixels is included in the region assumed to be the blocks each composed of N×M pixels at a time of multiplexing. The number of pixels to be skipped is basically the horizontal N pixels and the vertical M pixels, but it is necessary to correct it by calculating a displacement amount for each block and adding the calculated displacement amount to the number of skipped pixels. Here, the displacement amount for each block is calculated by dividing the displacement amount detected by the geometric displacement detection unit 701 by the number of blocks.

Numeral 703 denotes an orthogonal transformation unit which performs orthogonal transformation to the P×Q pixels given as the block. Here, it should be noted that, at a time of performing the two-dimensional orthogonal transformation, it is necessary to generate the blocks by the square block of Q=P. In the present embodiment, DCT (discrete cosine transform) will be explained by way of example.

A transformation coefficient of the two-dimensional DCT for the block composed of P×P pixels is given as follows.

$$F(u, v) = (2/P)C(u)C(v) \sum_{n=0}^{p-1}\sum_{m=0}^{p-1} f(n, m)\cos((2n+1)u\pi/2P)\cos((2m+1)v\pi/2P) \quad (5)$$

where $C(x) = 1/\sqrt{2}$ $(x = 0)$, $C(x) = 1$ $(x \neq 0)$

Figure 8:
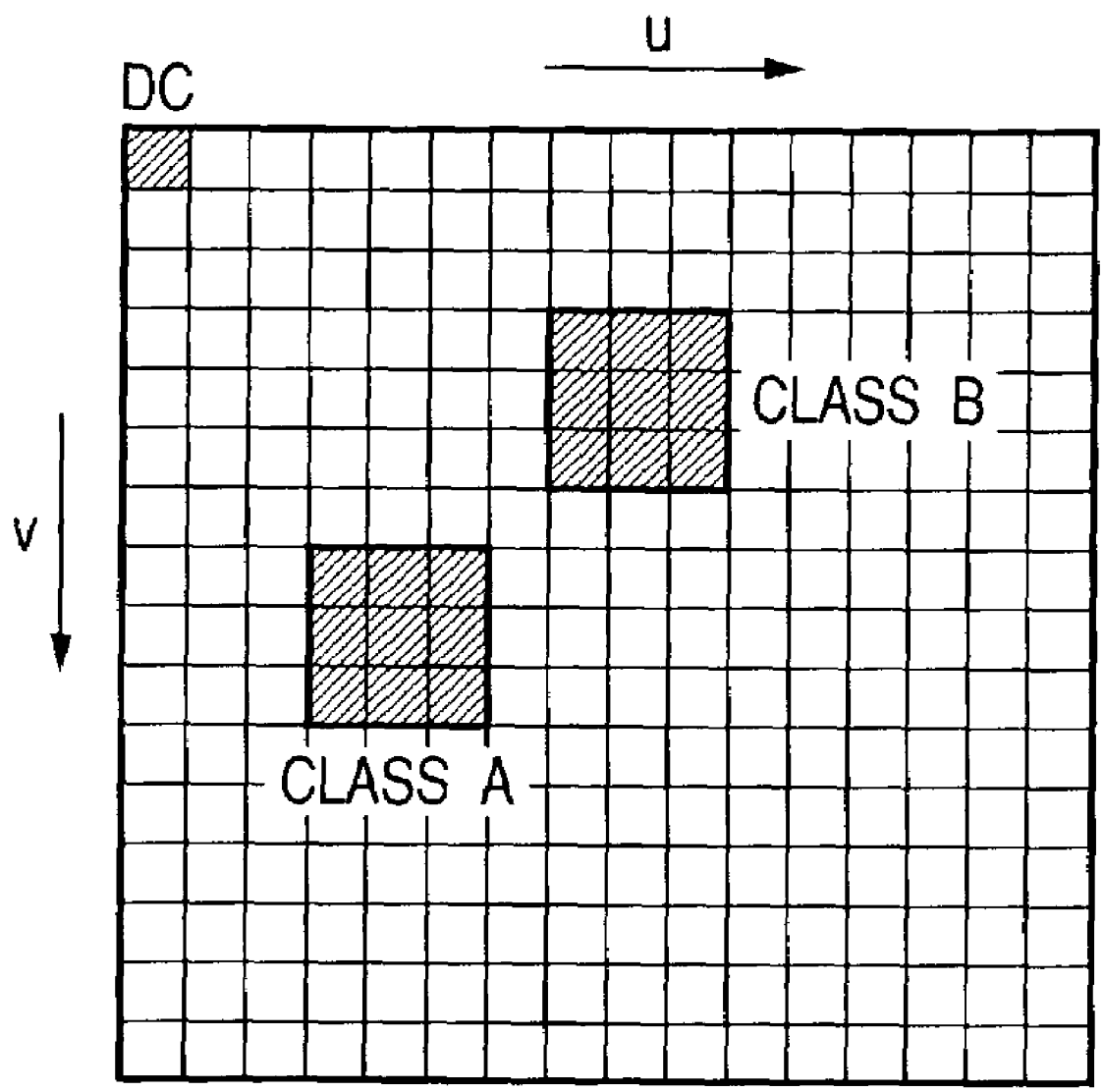
FIG. 8 is a block diagram showing classification in an orthogonal transformation block.

Numeral 704 denotes a classification unit which performs classification for each band of the orthogonal transformation coefficient. FIG. 8 shows an example of the classification in case of P=Q=16, and also shows the orthogonal transformation coefficients F(u, v) within one block. In FIG. 8, only the upper left component is a DC component, and the remaining 255 components are AC components. Here, two classes, i.e., a class A based on the coefficient F(4, 8) and a class B based on the coefficient F(8, 4), which are respectively indicated by the heavy lines in FIG. 8 are formed. Such a classification means does not need to perform the classification for all the 256 components, and it only has to perform the classification for the several classes based on the desired components. Here, it should be noted that the number of necessary classes corresponds to the number of periodicities added in the multiplexing, that is, the number of necessary classes does not exceed the number of periodicities added in the multiplexing.

Numeral 705 denotes a power comparison unit which compares the summation of power of each class with others. To achieve a high-speed operation, the absolute value of the generated transformation coefficient can be used as substitution of the power. The signal of the additional information is discriminated by comparing the summation of the power of each class with others.

Here, the example that the periodicities A and B respectively shown in FIGS. 6A and 6B are added in the multiplexing will be explained. As described above, the quantization based on the pseudo-gradation after the periodicities A and B are added greatly depends on the added amplitude value a, but texture that the dots are arranged respectively in the different-angled oblique directions is easily generated. That is, in the block to which the periodicity A is added, great power is generated in the class A of FIG. 8 if the orthogonal transformation is performed.

On the other hand, in the block to which the periodicity B is added, great power is generated in the class B of FIG. 8 if the orthogonal transformation is performed. That is, by relatively comparing the power in the class A with the power in the class B, it is possible to discriminate which of the periodicities A and B the periodicity added in the multiplexing of the corresponding block is. Since the periodicity is linked with the code of the additional information (i.e., bit in the expression (3)), to be able to discriminate the kind of periodicity represents to be able to specify the multiplexed code.

In the example of the flow chart shown in FIG. 4, since bit=0 is set as the periodicity A and bit=1 is set as the periodicity B, it is possible to discriminate that bit=0 if the power in the class A is larger and bit=1 if the power in the class B is larger.

The present embodiment shows the example that the periodicities to be added in the multiplexing are two, i.e., the periodicities A and B, and also the classifications in the separating are two, i.e., the classes A and B. Although this corresponds to the case where the additional information in the block is one bit, three or more classifications can be of course achieved by controlling more kinds of periodicities.

In the present embodiment, it is unnecessary to embed the information by performing the orthogonal transformation in the multiplexing as in the conventional art. That is, aberration of the frequency after the quantization is generated only by adding the different periodicities. Moreover, since the deviation of the frequency is caught up in the generation of the high-frequency component in the error diffusion method, the deviation is not visually detected easily.

As above, in the present embodiment, the more the geometric displacement becomes larger, the more the block-generated image becomes oblique, whereby the obtained frequency is aberrated from the desired frequency. For example, even in the case where the multiplexing is performed so that the large power is generated by the coefficient F(4, 8), if the image is oblique, the generated frequency is of course displaced from the coefficient F(4, 8). For this reason, it is possible to structure that the classification is dynamically changed based on a geometric displacement amount. Of course, if the displacement amount is small, one class may be composed of only one component in the classification.

Moreover, the present embodiment shows the periodicities A and B and the classes A and B by way of example, but the present invention is not limited to them, that is, other periodicities are applicable. Moreover, the periodicity may be added without using the table, but by using a counter, by changing the horizontal and vertical periods.

Moreover, although the binarization is explained as an example of the quantization in the present embodiment, the present invention is not limited to this.

Moreover, although the DCT is explained as an example of the orthogonal transformation, the present invention is not limited to this. That is, other orthogonal transformation such as Hadamard transformation, Fourier transformation, wavelet transformation or the like may be of course used.

Second Embodiment

Figure 9:
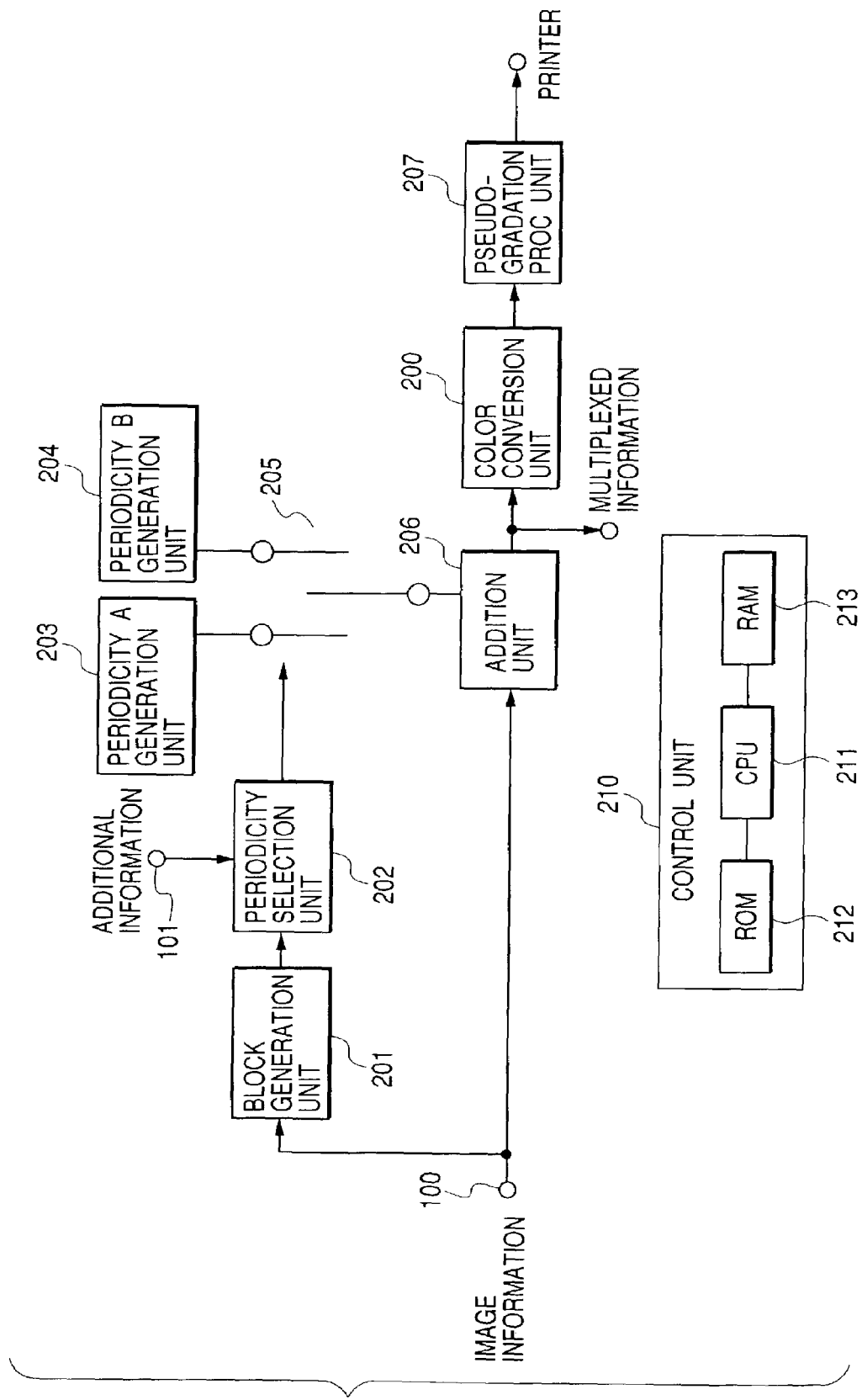
FIG. 9 is a block diagram showing the substantial part of an additional information multiplexing apparatus according to the second embodiment.

FIG. 9 is a block diagram showing the structure of an additional information multiplexing apparatus according to the second embodiment.

The feature of FIG. 9 is to locate a color conversion unit 200 at the subsequent stage of an addition unit 206. That is, in the first embodiment shown in FIG. 2, after the input information such as the R (red), G (green) and B (blue) information is converted into the information representing ink colors of Y (yellow), M (magenta), C (cyan) and K (black), the periodicity is added for each ink color to achieve the multiplexing. On the other hand, in the present embodiment shown in FIG. 9, the periodicity is directly added to R, G and B brightness information to achieve the multiplexing.

In the present embodiment, a multiplexing process is completed in the same color space as that for the input image information, whereby the information obtained after the multiplexing can be again used for storage, circulation and the like as an electronic file.

That is, the multiplexing information obtained at the subsequent stage of the addition unit 206 can be used as an image file in which an electronic watermark is inserted, or transmitted to a printer engine through a color conversion process and a pseudo-gradation process to be used as an on-paper image including the electronic watermark. Here, either cases can be achieved by the same process, whereby versatility is very high.

The present embodiment is explained as above, that is, the periodicity to be added to an image signal is selected according to whether a predetermined bit of additional information is "1" or "0". In case of separation (extraction), the additional information is discriminated based on the relative comparison of the power values, whereby the absolute power value by the specific band as shown in, e.g., Japanese Patent Application Laid-Open No. 7-123244 is unnecessary. That is, in the conventional technique that the absolute value of the power of the specific band is compared with the absolute value of the predetermined threshold, adverse effects due to various deterioration steps such as the influence of the pseudo-gradation process, the influence of noises on the paper, and the like become the problem. However, in the method of performing the relative comparison according to the present invention, the deterioration uniformly and equally occurs in each target band, whereby it is possible to reduce the above adverse effects in the conventional technique.

In the present embodiment, the additional information multiplexing apparatus and the additional information separation apparatus are explained as above. However, the present invention is not limited to such a combination of the additional information multiplexing apparatus and the additional information separation apparatus. Moreover, as the separation method of the separation apparatus, there is a method of decoding, without using the orthogonal transformation, the information by using a band-pass filter.

Third Embodiment

FIG. 10 is a block diagram showing the structure of an additional information multiplexing apparatus according to the third embodiment.

In the present embodiment, the various blocks shown in the second embodiment of FIG. 9 are classified into two kinds of blocks, i.e., a processing block for achieving the multiplexing of additional information and an image processing block depending on a printer engine characteristic. Here, the present embodiment is structured to control the processing block according to application software and control the image processing block according to a printer driver.

In FIG. 10, numeral 1000 denotes application software. In the application software 1000, image information is input through an input terminal 100, additional information is input through an input terminal 101, the image information and the additional information are multiplexed through a series of multiplexing processes, and multiplexed data is output to an output terminal 1001.

The multiplexed data output through the output terminal 1001 is once converted into predetermined-format data and then stored in a storage apparatus on a computer as an electronic file, or the output multiplexed data is directly transmitted to a printer driver 1002 as it is. The multiplexed data stored as the electronic file can be used for other application software to create documents or circulated on the Internet, as well as ordinary image information.

On the other hand, in the printer driver 1002, the multiplexed data is input from the application software 1000 or other application software through an input terminal 1003. Moreover, in the printer driver 1002, the input data is processed by a color conversion unit 2000 and a pseudo-gradation processing unit 207 which perform image processes inherent in a connected printer, and then output to the printer through an output terminal 1004, whereby the image data is printed irrespective of whether the multiplexed data.

That is, according to the present embodiment, the processes to achieve the multiplexing are completed in the application software, whereby it is possible to achieve the multiplexing process which does not depend on the characteristic inherent in the printer engine. For example, in the above embodiment shown in FIG. 2, the multiplexing process is performed after the color conversion process depending on the characteristic of the printer engine, whereby it is necessary to design the parameters for the multiplexing process optimized for the characteristic of the ink color inherent in the printer engine. As a result, it is necessary to design, for each apparatus, the multiplexing parameters depending on the kind of apparatus in proportion to the number of printers achieving the multiplexing process, whereby a load of design increases.

On the other hand, according to the present embodiment, the multiplexing process is completely separated from the process inherent in the printer device. Thus, it is possible to create the printed image of the multiplexed data from any printer irrespective of whether the multiplexing process is performed by the printer driver, as long as the application software achieving the multiplexing process is used.

For example, with respect to the image data multiplexed by the application software, a user who has plural printers can always print the same multiplexed image data even if he arbitrarily changes the printer and the device driver of this printer.

OTHER EMBODIMENTS

The present invention is applicable to a system composed of plural apparatuses (e.g., a host computer, an interface apparatus, a reader, a printer and the like) or to a single apparatus (e.g., a copying machine, a facsimile apparatus or the like).

Moreover, it is needless to say that the object of the present invention can be achieved in a case where a storage medium (or a recording medium) storing the program codes of software to realize the functions of the above embodiments is supplied to a system or an apparatus and then a computer (or CPU or MPU) in the system or the apparatus reads and executes the program codes stored in the storage medium. In this case, the program codes themselves read from the storage medium realize the functions of the above embodiments, whereby the storage medium storing these program codes constitutes the present invention. Moreover, it is needless to say that the present invention also includes not only a case where the functions of the above embodiments are realized by executing the program codes read by the computer, but also a case where an OS (operating system) or the like functioning on the computer executes a part or all of the actual process according to the instructions of the program codes, whereby the functions of the above embodiments are achieved by that process.

Moreover, it is needless to say that the present invention includes a case where the program codes read from the storage medium are once written in a memory provided in a function expansion card inserted in the computer or a function expansion unit connected to the computer, and then a CPU or the like provided in the function expansion card or the function expansion unit executes a part or all of the actual process according to the instructions of the program codes, whereby the functions of the above embodiments are achieved by that process.

As explained above, according to the present invention, the different periodicity is selected according to the additional information and thus the additional information is actually embedded, the image quality deterioration or the like due to the embedding of the additional information is not visibly recognized, and it is possible to embed the additional information so that the embedded information can be easily extracted from the paper. storage medium.

Moreover, the additional information can be easily multiplexed in the image information, whereby it is possible to provide service and application for embedding audio information or secret information in the image information. Moreover, it is possible to control an illegal forgery act for bank notes, stamps, valuable securities and the like, and it is also possible to prevent a copyright infringement of the image information.

What is claimed is:

1. An image processing apparatus which embeds predetermined information in an image, comprising:
   input means for inputting the image;
   division means for dividing the input image into plural image regions, the respective image regions having a same size;
   periodicity generation means for generating plural different periodicities, the plural different periodicities being generated in different directions;
   addition means for adding a positive predetermined value or a negative predetermined value to a pixel value of each pixel in the image region divided by said division means, on the basis of the periodicity; and
   selection means for selecting the periodicity for the addition from among the plural periodicities, in accordance with the predetermined information, as a result of the addition by said addition means, plural lines which are composed of plural pixels to which the positive predetermined value and the negative predetermined value are added and which are based on the respective directions of periods are formed within the respective image regions divided by said division means.

2. An apparatus according to claim 1, wherein the plural periodicities are obtained as sets of the horizontal period and the vertical period which have been mutually replaced.

3. An apparatus according to claim 1, wherein said addition means adds the predetermined value to a density signal according to each pixel.

4. An apparatus according to claim 1, wherein the periodicities are generated by using plural different tables.

5. An image processing apparatus which embeds predetermined information in an image, comprising:
   input means for inputting the image;
   division means for dividing the input image into plural image regions, the respective image regions having a same size;
   periodicity generation means for generating plural different periodicities, the plural different periodicities being generated in different directions;
   addition means for adding a positive predetermined value or a negative predetermined value to a pixel value of each pixel in the image region divided by said division means, on the basis of the periodicity;
   selection means for selecting the periodicity for the addition from among the plural periodicities, in accordance with the predetermined information;
   conversion means for converting each pixel into a density signal for each coloring material; and
   recording means for recording the density signal after the conversion by said conversion means, on a printing medium,
   wherein said addition means performs the addition process to the information before the conversion by said conversion means, and
   wherein, as a result of the addition by said addition means, plural lines which are composed of plural pixels to which the positive predetermined value and the negative predetermined value are added and which are based on the respective directions of periods are formed within the respective image regions divided by said division means.

6. An apparatus according to claim 5, wherein the process by each of said input means, said division means, said periodicity generation means, said addition means and said selection means is executed in application software, and the process by each of said conversion means and said recording means is executed in a printer driver.

7. An image processing method of embedding predetermined information in an image, comprising:
   an input step of inputting the image;
   a division step of dividing the input image into plural image regions, the respective image regions having a same size;
   a periodicity generation step of generating plural different periodicities, the plural different periodicities being generated in different directions;
   an addition step of adding a positive predetermined value or a negative predetermined value to a pixel value of each pixel in the image region divided in said division step, on the basis of the periodicity; and
   a selection step of selecting the periodicity for the addition from among the plural periodicities, in accordance with the predetermined information,
   as a result of the addition by said addition means, plural lines which are composed of plural pixels to which the positive predetermined value and the negative predetermined value are added and which are based on the respective directions of periods are formed within the respective image regions divided by said division means.

8. An image processing method of embedding predetermined information in an image, comprising:
   an input step of inputting the image;
   a division step of dividing the input image into plural image regions, the respective image regions having a same size;
   a periodicity generation step of generating plural different periodicities, the plural different periodicities being generated in different directions;
   an addition step of adding a positive predetermined value or a negative predetermined value to a pixel value of each pixel in the image region divided in said division step, on the basis of the periodicity;
   a selection step of selecting the periodicity for the addition from among the plural periodicities, in accordance with the predetermined information;
   a conversion step of converting each pixel into a density signal for each coloring material; and
   a recording step of recording the density signal after the conversion in said conversion step, on a printing medium,
   wherein the addition process in said addition step is performed to the information before the conversion in said conversion step, and wherein, as result of the addition by said addition means, plural lines which are composed of plural pixels to which the positive predetermined value and the negative predetermined value are added and which are based on the respective directions of periods are formed within the respective image regions divided by said division means.

9. A program embodied in a computer-readable storage medium, which is executed on a computer to achieve an image processing method of embedding predetermined information in an image, said method comprising:

an input step of inputting the image;

a division step of dividing the input image into plural image regions, the respective image regions having a same size;

a periodicity generation step of generating plural different periodicities, the plural different periodicities being generated in different directions;

an addition step of adding a positive predetermined value or a negative predetermined value to a pixel value of each pixel in the image region divided in said division step, on the basis of the periodicity; and a selection step of selecting the periodicity for the addition from among the plural periodicities, in accordance with the predetermined information, wherein, as a result of the addition by said addition means, plural lines which are composed of plural pixels to which the positive predetermined value and the negative predetermined value are added and which are based on the respective directions of periods are formed within the respective image regions divided by said division means.

10. A program embodied in a computer-readable storage medium, which is executed on a computer to achieve an image processing method of embedding predetermined information in an image, said method comprising:

an input step of inputting the image;

a division step of dividing the input image into plural image regions, the respective image regions having a same size;

a periodicity generation step of generating plural different periodicities, the plural different periodicities being generated in different directions;

an addition step of adding a positive predetermined value or a negative predetermined value to a pixel value of each pixel in the image region divided in said division step, on the basis of the periodicity;

a selection step of selecting the periodicity for the addition from among the plural periodicities, in accordance with the predetermined information;

a conversion step of converting each pixel into a density signal for each coloring material; and a recording step of recording the density signal after the conversion in said conversion step, on a printing medium, wherein the addition process in said addition step is performed to the information before the conversion in said conversion step, and wherein, as a result of the addition by said addition means, plural lines which are composed of plural pixels to which the positive predetermined value and the negative predetermined value are added and which are based on the respective directions of periods are formed within the respective image regions divided by said division means.

11. A computer-readable recording medium having recorded thereon a program to be executed on a computer to achieve an image processing method of embedding predetermined information in an image, said method comprising:

an input step of inputting the image;

a division step of dividing the input image into plural image regions, the respective image regions having a same size;

a periodicity generation step of generating plural different periodicities, the plural different periodicities being generated in different directions;

an addition step of adding a positive predetermined value or a negative predetermined value to a pixel value of each pixel in the image region divided in said division step, on the basis of the periodicity; and a selection step of selecting the periodicity for the addition from among the plural periodicities, in accordance with the predetermined information, wherein, as a result of the addition by said addition means, plural lines which are composed of plural pixels to which the positive predetermined value and the negative predetermined value are added and which are based on the respective directions of periods are formed within the respective image regions divided by said division means.

12. A computer-readable recording medium which records thereon a program to be executed on a computer to achieve an image processing method of embedding predetermined information in an image, said method comprising:

an input step of inputting the image;

a division step of dividing the input image into plural image regions, the respective image regions having a same size;

a periodicity generation step of generating plural different periodicities, the plural different periodicities being generated in different directions;

an addition step of adding a positive predetermined value or a negative predetermined value to a pixel value of each pixel in the image region divided in said division step, on the basis of the periodicity;

a selection step of selecting the periodicity for the addition from among the plural periodicities, in accordance with the predetermined information;

a conversion step of converting each pixel into a density signal for each coloring material; and a recording step of recording the density signal after the conversion in said conversion step, on a printing medium, wherein the addition process in said addition step is performed to the information before the conversion in said conversion step, and wherein, as a result of the addition by said addition means, plural lines which are composed of plural pixels to which the positive predetermined value and the negative predetermined value are added and which are based on the respective directions of periods are formed within the respective image regions divided by said division means.

* * * * *

UNITED STATES PATENT AND TRADEMARK OFFICE
CERTIFICATE OF CORRECTION

| | |
|---|---|
| PATENT NO. | : 7,171,019 B2 |
| APPLICATION NO. | : 10/252702 |
| DATED | : January 30, 2007 |
| INVENTOR(S) | : Nobutaka Miyake et al. |

It is certified that error appears in the above-identified patent and that said Letters Patent is hereby corrected as shown below:

Col. 1, Line 51, "it" should be deleted.
      Line 57, "generated" should read --generate--.

Col. 2, Line 30, "can not" should read --cannot--.

Col. 4, Line 4, "be" should be deleted.

Col. 5, Line 67, "example" should read --examples--.

Col. 6, Line 19, "an" should read --a--.

Col. 7, Line 2, "can not" should read --cannot--.

Col. 8, Line 12, "a" should read --α--.
      Line 20, "used scanner" should read --scanner used--.

Col. 9, Line 51, "value a" should read --value α--.

Col. 12, Line 7, "irrespective of whether" should read --irrespective of--.

Col. 13, Line 12, "paper." should read --paper--.

Signed and Sealed this

Seventeenth Day of July, 2007

JON W. DUDAS
*Director of the United States Patent and Trademark Office*